(12) United States Patent
Wahle et al.

(10) Patent No.: US 12,273,962 B2
(45) Date of Patent: Apr. 8, 2025

(54) DETERMINING OCCUPANCY LEVEL OF ITEMS PLACED ON A SURFACE USING LOW ENERGY SENSING TAGS

(71) Applicant: Wiliot, Ltd., Caesarea (IL)

(72) Inventors: Amnon Wahle, Tel-Aviv (IL); Ido Zelman, Hod Hasharon (IL); Tsvika Rabkin, Pardes Hanna-Karkur (IL); Gidon Azaryev, Tel-Aviv (IL)

(73) Assignee: Wiliot, Ltd., Caesarea (IL)

( * ) Notice: Subject to any disclaimer, the term of this patent is extended or adjusted under 35 U.S.C. 154(b) by 359 days.

(21) Appl. No.: 17/660,925

(22) Filed: Apr. 27, 2022

(65) Prior Publication Data

US 2023/0354476 A1    Nov. 2, 2023

(51) Int. Cl.
H04W 84/18       (2009.01)
G06F 18/214      (2023.01)
G06N 20/00       (2019.01)
H04B 17/318      (2015.01)

(52) U.S. Cl.
CPC ........ H04W 84/18 (2013.01); G06F 18/2155 (2023.01); G06N 20/00 (2019.01); H04B 17/318 (2015.01)

(58) Field of Classification Search
CPC .............................. G06F 18/2155; H04L 84/18
USPC ......................................................... 370/338
See application file for complete search history.

(56) References Cited

U.S. PATENT DOCUMENTS

| | | | |
|---|---|---|---|
| 7,775,083 B2 | 8/2010 | Potyrailo et al. | |
| 8,955,340 B2 | 2/2015 | Burke et al. | |
| 10,003,913 B2 | 6/2018 | Jin et al. | |
| 10,194,295 B2 | 1/2019 | Agostinelli et al. | |
| 10,275,710 B1 | 4/2019 | Teredesai et al. | |
| 10,282,967 B2 | 5/2019 | Law | |
| 10,467,501 B2 | 11/2019 | Sivakumar et al. | |
| 2017/0227673 A1 | 8/2017 | Venugopalan et al. | |
| 2019/0073627 A1* | 3/2019 | Nakdimon | G06Q 10/087 |

(Continued)

FOREIGN PATENT DOCUMENTS

EP    3707661 A1    9/2020
WO    2004081897 A2    9/2004

(Continued)

OTHER PUBLICATIONS

International Search Report for PCT/IB2023/053804, dated Sep. 11, 2023. International Searching Authority Israel Patent Office Jerusalem, Israel.

(Continued)

Primary Examiner — Sibte H Bukhari
(74) Attorney, Agent, or Firm — M&B IP Analysts, LLC

(57) ABSTRACT

A system and method for determining and monitoring occupancy level of items placed on a surface are provided. The system comprises receiving frequency words from tags placed on the surface, wherein each tag is configured to transmit a plurality of frequency words; extracting at least one data feature from the plurality of frequency words, wherein each data feature changes in response to an item placed in a proximity to a respective tag; determining, based on the extracted at least one data feature from a group of tags placed on the surface and based on at least one baseline, the occupancy level of items placed on the surface; and reporting the determined occupancy level of items.

31 Claims, 8 Drawing Sheets

(56) References Cited

U.S. PATENT DOCUMENTS

2021/0158405 A1* 5/2021 Sandre .............. G06Q 30/0623
2021/0160349 A1* 5/2021 Hoffmann .............. H04L 69/22
2021/0257074 A1    8/2021 Zelman et al.

FOREIGN PATENT DOCUMENTS

WO    2015128635 A1    9/2015
WO    2017175243 A1    10/2017

OTHER PUBLICATIONS

Written Opinion of the Searching Authority for PCT/IB2023/053804, dated Sep. 11, 2023. International Searching Authority Israel Patent Office Jerusalem, Israel.

Van Alexander, Gede Putra Kusuma. "Predicting Indoor Position Using Bluetooth Low Energy And Machine Learning". International Journal of Scientific & Technology Research Volume 8, Issue 09, Sep. 2019.

Vasilis Stavrou, Cleopatra Bardaki, Dimitris Papakyriakopoulos, and Katerina Pramatari. "An Ensemble Filter for Indoor Positioning in a Retail Store Using Bluetooth Low Energy Beacons". Sensors. Received: Sep. 6, 2019; Accepted: Oct. 18, 2019; Published: Oct. 19, 2019.

* cited by examiner

DETERMINING OCCUPANCY LEVEL OF ITEMS PLACED ON A SURFACE USING LOW ENERGY SENSING TAGS

TECHNICAL FIELD

The present disclosure generally relates to a system and method for determining occupancy levels of items on surfaces, and more particularly, for determining occupancy levels from data gathered from low-energy sensing tags.

BACKGROUND

Determining and monitoring occupancy levels of products are important to determine, for example, an inventory level, a shelf-time of a product, misplacement of items, and so on. Monitoring the occupancy level can also be used to detect theft of products. The products or items are typically places on shelves and containers, but once placed, there are no efficient solutions to monitor occupancy. This problem is related to many industries including, but not limited to, retail, manufacturing, medical, and so on.

Current solutions to monitor occupancy levels of shelves and containers are not efficient as they are required manual labor or complex infrastructure. For example, one solution would include a person to count all items placed on a shelf. This would require expensive labor and may result in human error.

An automated solution includes on-shelf sensors and tracking cameras that are placed on shelves to determine any changes in the volume of products. Such on-shelf sensors are either based on light or weight. For example, a weight sensor would measure the total weight of items placed in a container and alert when the weight changes, to indicate increase or decrease in the number of the items in the container. Cameras capture the items placed on the shelf. However, such on-shelf sensors are cumbersome to install and maintain. Similarity, tracking cameras are heavy and cannot be placed on small or light weight shelves. Both, sensors and tracking cameras cannot accurately measure the number of items placed on a shelf.

Other solutions are related to inventory management, and specifically inventory management of a specific shelf or a group of shelves. The solution in based on scanning products removed from the shelf and updating the inventory management system in real time for any products added or removed. Such solutions require a human to proactively scan the products, and thus, if products are placed or removed without scanning, the inventory level would not be accurate. To replace humans from scanning products, robots are now introduced to go through aisles and scan the items placed on the shelves. But this would require additional piece of machinery. Which would require additional machinery and further require rearrangement of space.

It would therefore be advantageous to provide a solution for monitoring the occupancy level of items placed that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for determining and monitoring occupancy level of items placed on a surface. The method includes receiving frequency words from tags placed on the surface, wherein each tag is configured to transmit a plurality of frequency words; extracting at least one data feature from the plurality of frequency words, wherein each data feature changes in response to an item placed in a proximity to a respective tag; determining, based on the extracted at least one data feature from a group of tags placed on the surface and based on at least one baseline, the occupancy level of items placed on the surface; and reporting the determined occupancy level of items.

Certain embodiments disclosed herein include a system for determining and monitoring occupancy level of items placed on a surface. The system comprises receiving frequency words from tags placed on the surface, wherein each tag is configured to transmit a plurality of frequency words; extracting at least one data feature from the plurality of frequency words, wherein each data feature changes in response to an item placed in a proximity to a respective tag; determining, based on the extracted at least one data feature from a group of tags placed on the surface and based on at least one baseline, the occupancy level of items placed on the surface; and reporting the determined occupancy level of items.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
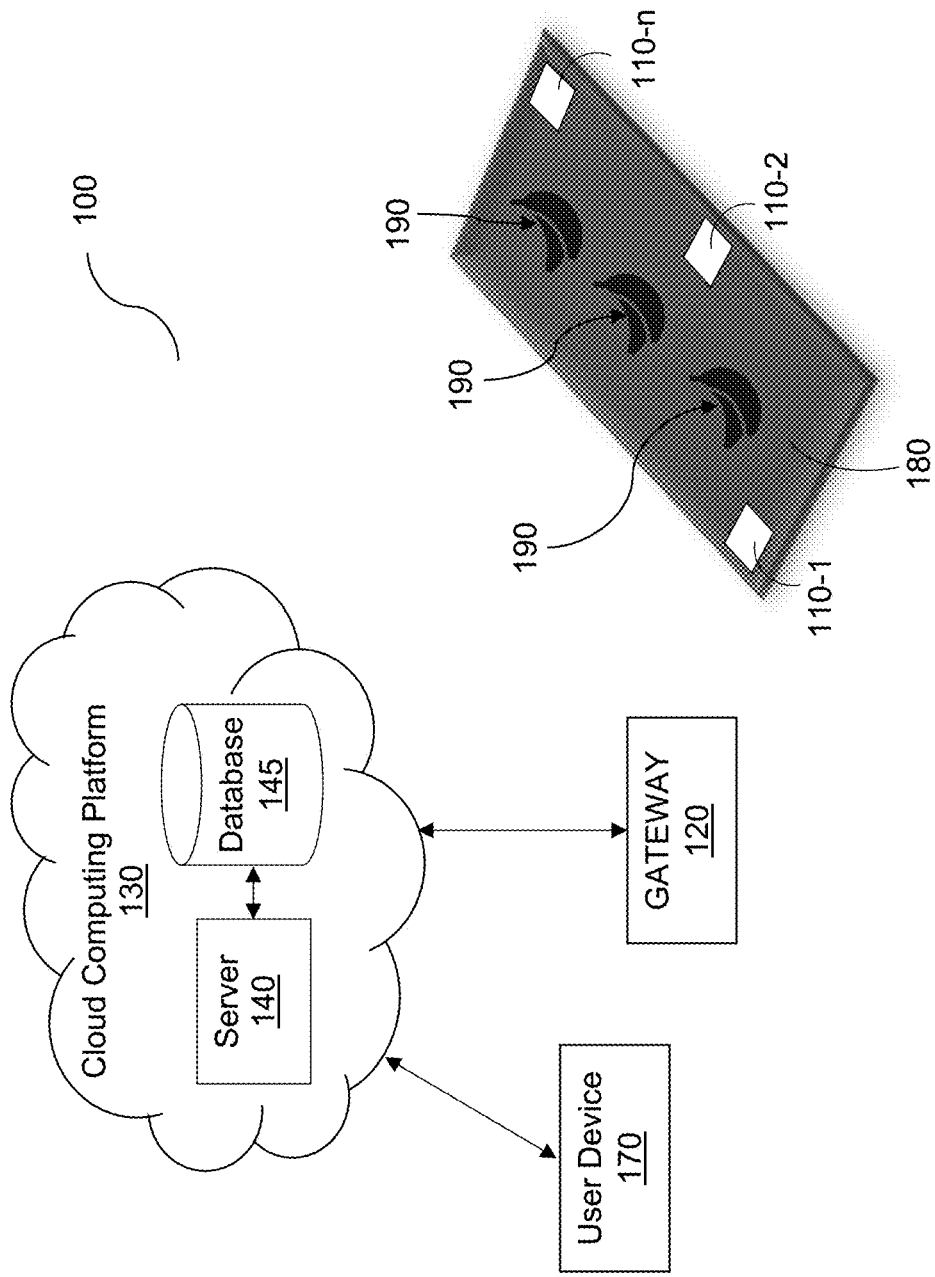
FIG. 1 is a schematic diagram of a secure low energy communication system utilized to describe the various embodiments for monitoring and determining occupancy level of items on a surface.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The method and system disclosed according to various disclosed examples are related to determining and monitoring the occupancy level of items placed, for example, on a surface. The occupancy level is determined by the processing frequency of words (or other signals) received from IoT tags placed on the surface. In an embodiment, processing such frequency words includes determining changes in the received frequency words relative to one or more baselines. Such baselines capture the occupancy levels at different states (e.g., empty, full, etc.). It should be noted that the disclosed embodiments will be discussed concerning a specific example of determining and monitoring the occupancy level of items placed on a surface. However, the disclosed embodiments are applicable to detect "things" located in proximity to a surface configured to include the IoT tags. Specifically, the "things" may include items, objects in a different state of matter (solid, liquid, gas), the surface can be any shape or form (e.g., a barrel, a container, a box, a shelf, and so on) may of any type of material (e.g., glass, wood, metal, plastic, and so on). Further, the proposition "on" should not be limited to the arrangement of such items on the surface. That is, the items can be placed "in" the surface, "under" the surface, "inside" the surface, "nearby" the surface, and so on. Further, the surface can be arranged in a horizontally, vertically, or any angle relative to the floor.

FIG. 1 is an example schematic diagram of a low energy communication system 100 utilized to describe the various embodiments. The system 100 includes a plurality of wireless Internet of Things (IoT) tags 110-1 through 110-*n* (collectively referred to as a IoT tag 110 or IoT tags 110), at least one gateway 120, and a cloud computing platform 130. The system 100 also includes at least one server 140 that may be deployed in the cloud computing platform 130. The server 140 may be realized as a physical machine, a virtual machine, or a combination thereof. An example block diagram of the server 140 is provided in FIG. 8. The cloud computing platform 130 may be a public cloud, a private cloud, a hybrid cloud, or combination thereof. A database 145 may also deployed in the cloud computing platform 130 and may be connected to the server 140. The database 145 may store events generated by server 140, identifiers (IDs) of IoT tags 110, and other signals.

Figure 7:
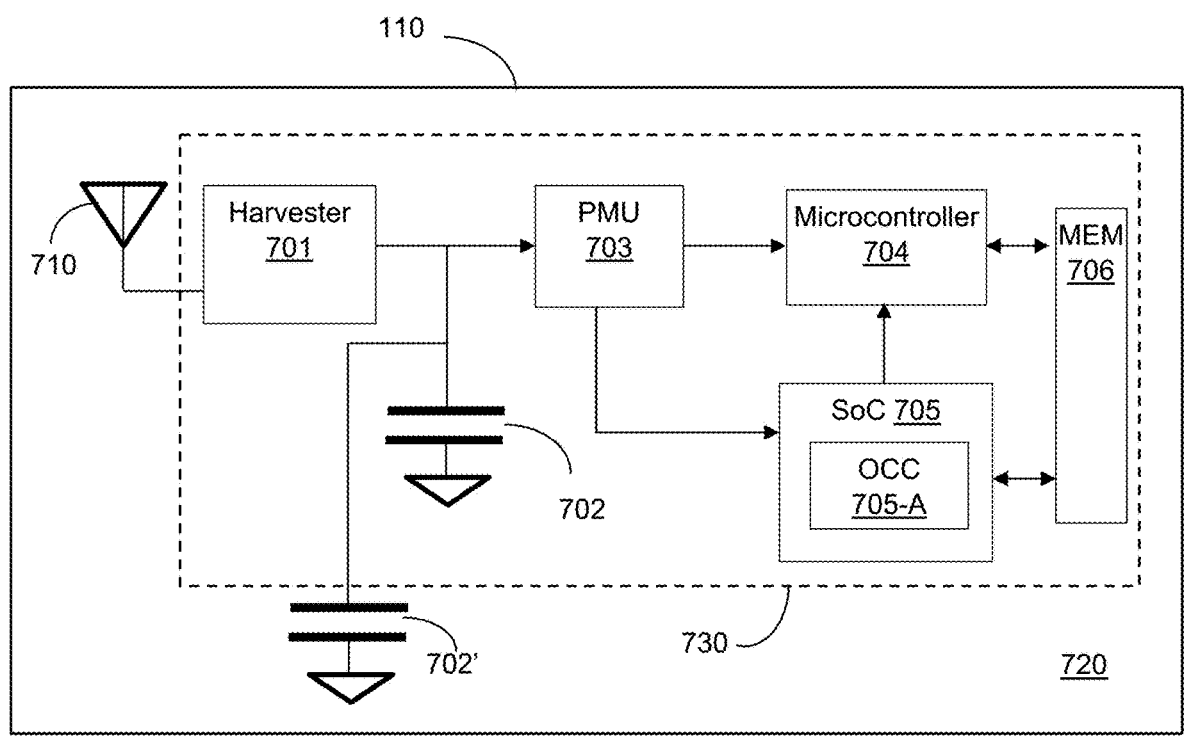
FIG. 7 is a schematic diagram of a wireless IoT tag utilized according to the disclosed embodiments.

In an embodiment, the IoT tag 110 is a battery-free IoT tag as discussed in FIG. 7. Also, communication among the IoT tag 110 and the gateway 120 may be performed using a low-energy communication protocol. The communication between the cloud computing platform 130 and the gateway 120 is over, for example, the Internet.

In an example embodiment, the low-energy communication protocol includes a Bluetooth Low Energy (BLE) protocol, which are short-wavelength radio waves operating at a range of about 2.40 to 2.485 MHZ, and commonly used among portable wireless devices. The cloud computing platform 130 may include a public cloud, a private cloud, a hybrid cloud, or combination thereof.

In the example embodiment illustrated in FIG. 1, the IoT tags 110 are deployed or placed on a surface 180, which is a shelf. It should be noted that the surface may be in any shape or form, and not limited to a rectangular shelf shown in FIG. 1. That is, the IoT tags 110 may be deployed or placed in a container, box, barrel, and the like. Thus, the surface 180 discussed herein should not be limited to a shelf only. The IoT tags 110 may be glued, attached, or fastened to the surface 180. For example, the form factor of an IoT tag 110 may be a sticker that can be glued to the surface 180.

On the surface 180, a number of items (collectively referred to as items 190) are placed. The items 190 can be any type of product or object ranging from groceries to fashion items. For example, the surface 180 is a store display of handbags (e.g., items 190). As another example, the surface 180 is a box of tomatoes (e.g., items 190).

According to an embodiment, the IoT tags 110 are placed on the surface 180 at a predefined distance from each other. The number of IoT tags 110 to be placed and the distance between them are determined based on the type and form of the surface 180 and the type of items 190. In an embodiment, the number of IoT tags 110 to be placed is also determined based on the size, contents, and/or shape of the items on the surface 180. It should be noted that no IoT tag 110 is placed on an item 190.

According to the disclosed embodiments, the occupancy level of the items 190 on the surface 180 is continuously monitored and reported on a user device 170. In an embodiment, an alert on a current occupancy level can be also generated and displayed on the user device 170 or sent to other users as an email, a text message, and the like. The connection between the device 170 and the server 140 is over the Internet. In other configurations, the notifications (such as the current occupancy level) are reported on the display on the gateway 120. This depends on the configuration of the gateway 120 if such includes a display. The user device 170 may include, for example, a personal computer (PC), a smartphone, a laptop, a user terminal, and the like.

In an embodiment, the occupancy level of the items 190 is determined by receiving sensing signals from the IoT tags 110, pre-processing and relaying on the received sensing signals to the server 140 by the gateway 120, and processing the sensing signals by the server 140 to determine a current occupancy level. The determined current occupancy level is reported back from the server 140 to the gateway 120, which in return may be displayed on the user device 170.

The gateway 120 may be configured to receive signals from the IoT tags 110, encapsulate the received signals together with additional data in data packets, and transmit the data packets to the cloud computing platform 130 to be processed by the server 140. The communication with the IoT tags 110 may be performed over low-energy communication protocol (e.g., BLE) while the communication with the cloud computing platform 130 may be, for example, over the Internet. An example implementation of a gateway 120 is discussed below.

In an embodiment, an IoT tag 110 senses a particular radio frequency (RF) activity relative to other IoT tags 110 and relative to changes of items 190 placed on the surface 180. The sensing by, each IoT tag 110, is performed at a certain location that the IoT tag is located. When an item 190 is placed proximate to one of the IoT tags 110 (e.g., the IoT tag 110-1), an interference to the ambient RF field causes a change in a calibration frequency of the IoT tag (e.g., 110-1), such change is translated into a frequency word.

As will be explained in more detail below, an IoT tag 110 is configured to send frequency words along with other information to the gateway 120. The gateway 120 is further configured to relay the combined information to the server 140. The server 140 is configured to perform further processing to determine or compute the occupancy level of items 190 on the surface 180.

In an embodiment, a data packet transmitted by the gateway 120 includes a digital frequency word and an identifier (ID) of an IoT tag 110. The frequency word is measured by an IoT tag 110 depending on a frequency calibration of the IoT tag 110. Any items 190 placed on or in proximity to an IoT tag 110 will change the value detected by the tag 110 from synchronization, thereby changing the value of the frequency word. A value of frequency word can be measured as dBC/Hz, where the dBC is dBC unit is decibels relative to the carrier. In an example embodiment, the frequency calibration is discussed in more detail with reference to FIG. 7.

In an embodiment, a transmission frequency may be determined based on a digitally controlled oscillator (DCO) signal. The DCO is utilized to calibrate an internal capacitor that changes its capacitance value to counteract the capacitance that a new material imposes, the DCO signal is a control signal of the internal capacitor. That is, the IoT tag 110 senses whether the transmission frequency is corrected and, if not, the DCO is adjusted to the main frequency of the transmission. When an item is placed in a proximity to a tag, the tag recalibrates itself to the same transmission frequency by changing the capacitance value of its internal capacitor. In an embodiment, the transmission frequency may be one of the channels of the BLE transmission protocol. It should be noted that other low energy communication protocols are also applicable.

Figure 6:
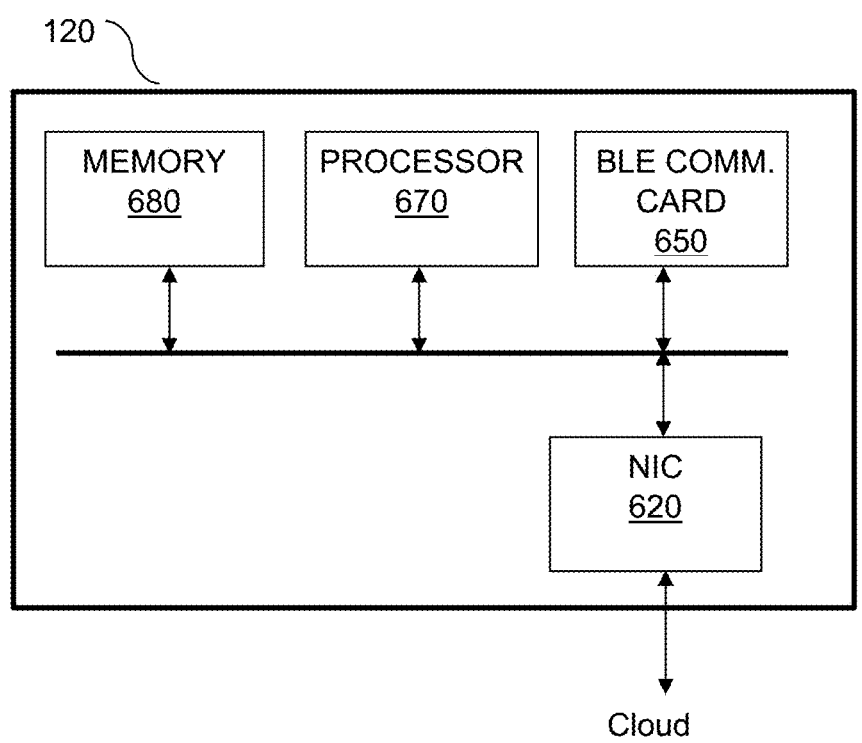
FIG. 6 is a schematic diagram of a gateway used for detecting items using low energy sensing, according to an embodiment.

In an embodiment, the ID is a unique identifier (ID) of the IoT tag 110 which is set during production of the IoT tag 110. The data packets sent by the IoT tag 110 are received at a gateway 120 which, in turn, is periodically configured to send the data packets to the server 140. An example block diagram of a gateway 120 is shown in FIG. 6. In an embodiment, a gateway 120 may be installed with an agent or application (not shown in FIG. 1) in a standard computing device (such as a PC, a laptop, tablet computer, a smartphone, and the like). The agent, when executed, is configured to control the communication between the IoT tag 110 and the server 140.

In example configuration, the server 140 communicates with a handheld user device 170 over the Internet. In other configurations, the user device 170 is configured to communicate with the gateway 120 as well. The server 140 is configured to generate messages and display such messages on the user device 170. The messages may include a current occupancy level, alerts on a low occupancy level, statistical information, and so on.

The server 140 is configured to process the data packets received by the gateway 120 to determine or compute the occupancy level of items 190. In an embodiment, the occupancy level computation is based on analysis of the frequency words from all or a group of IoT tags 110. Such group may include all or a subset of the IoT tags placed on a specific surface. All tags in the same group may be labeled with the same group ID, where such group ID is assigned by the gateway 120.

To this end, the server 140 is first configured to create a baseline of an empty surface 180 (e.g., not items are placed on the shelf), by recording and analyzing the frequency words transmitted by the IoT tags 110 when no items are placed on the surface 180. The IoT tags 110 are self-calibrated as a group when the surface 180 is empty. The calibration value of the group of IoT tags 110, represented as frequency words, are sent to the server 140.

In an embodiment, the occupancy level is determined with reference to the baseline (empty shelf) based on changes in the frequency words received from the IoT tags 110. As noted above, the IoT tags 110 are wireless sensing devices harvesting over-the-air energy. A change in the IoT tag 110 or its surrounding would trigger a change in its calibration frequency, and hence, in a frequency word, transmitted by the IoT tag 110. It should be emphasized that an IoT tag 110 does not generate an explicit signal indicating an item placed on the tag or its surrounding. The occupancy level is derived based on the changes in the values of the frequency words relative to the established baseline.

In an embodiment, two baselines may be determined, one representing an empty surface (or shelf) and one of a full surface. The occupancy level may be determined based on these two levels.

In yet another embodiment, the occupancy level is determined based on the number of IoT tags reporting changes in their frequency words relative to an empty surface baseline and a full surface baseline. For example, if there are 10 tags place on a shelf and 5 tags reported a change in their frequency words relative to an "empty baseline", the occupancy level is determined to be 50%.

According to some example embodiments, the server 140 is configured to implement machine learning processes to compute the occupancy level. The machine learning processes may be based on one or more classifiers, trained or self-trained, to classify data features and determine the occupancy level of items 190. That is, the machine learning processes may include, for example, supervised, self-supervised, semi-supervised, or unsupervised machine learning classifier.

According to an embodiment, the data features utilized for such classification are extracted from the frequency words. A first data feature is extracted from the difference between two consecutive frequency words (or content of consecutive data packets) received from to the same group of tags, and a second data feature is a rate of receiving the frequency words related to a group of tags. As will be discussed below, the classifiers implemented by the server 140 may utilize one or both of these data features.

In the alternative, detection of RF values from multiple co-located IoT tags 110 may be analyzed within various temporal windows to determine which of the respective frequency words have anomalies. Co-location sensing may be detected by the gateway 120. When no items are located on the shelf, the IoT tags 110 may have similarly sensed RF values.

Figure 2:
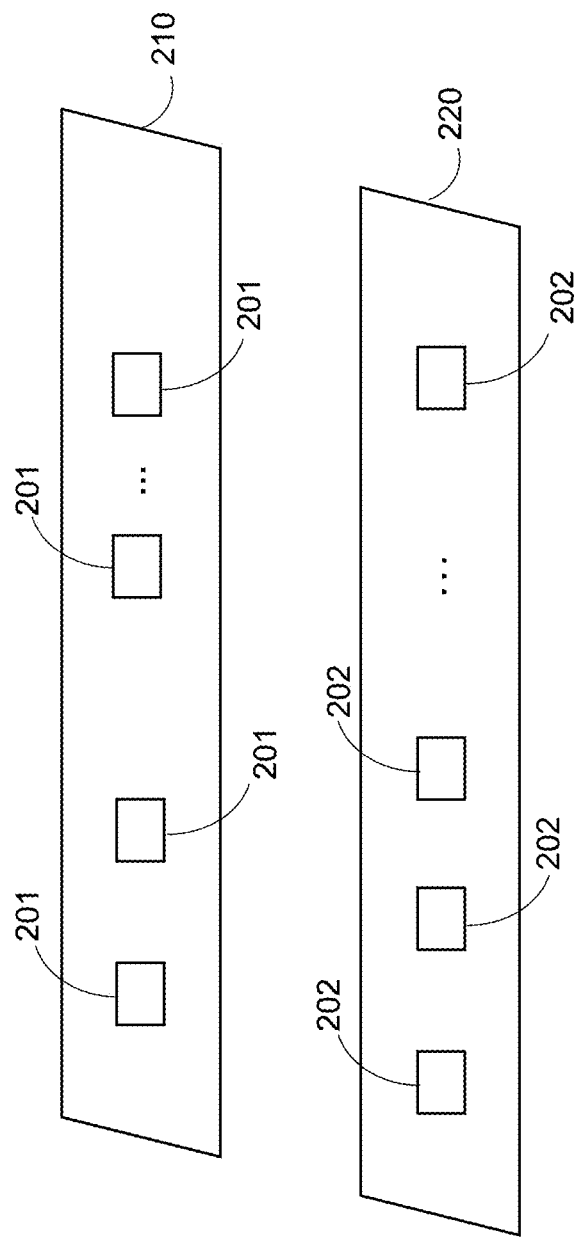
FIG. 2 shows arrangements of two shelves with items to be monitored.

In some configurations, the gateway 120 may receive signals from IoT tags 110 located on different surfaces 180. That is, for example, the gateway 120 may receive signals from IoT tags 110 located on different shelves, different containers, and/or different boxes located in the same store. A group of IoT tags 110 on the same surface 180 will be assigned with the same group and the same group ID. As in the example shown in FIG. 2, signals from tags 201 on a shelf 210 will be associated with a different group ID than signals from tags 202 on a shelf 220. Signals from both tags 201 and 202 are received by the gateway 120.

Returning to FIG. 1, as the communication between the gateway 120 and the IoT tags 110 is a low-power communication protocol, such as BLE, the distance between the tags and gateway is determined by the communication range of the protocol.

The gateway 120 may be realized as a computing device, such as a laptop, a smartphone, a PC, and the like, installed with an agent. The agent is configured to receive the signals from the IoT tags 110, assign a group ID, and encapsulate the signals in packets sent to the server 140.

It should be noted that the arrangement shown in FIG. 1 is for example proposes only. For example, multiple gateways can be deployed in a location (e.g., a warehouse), the server 140 may be on-premises, and so on.

Figure 3:
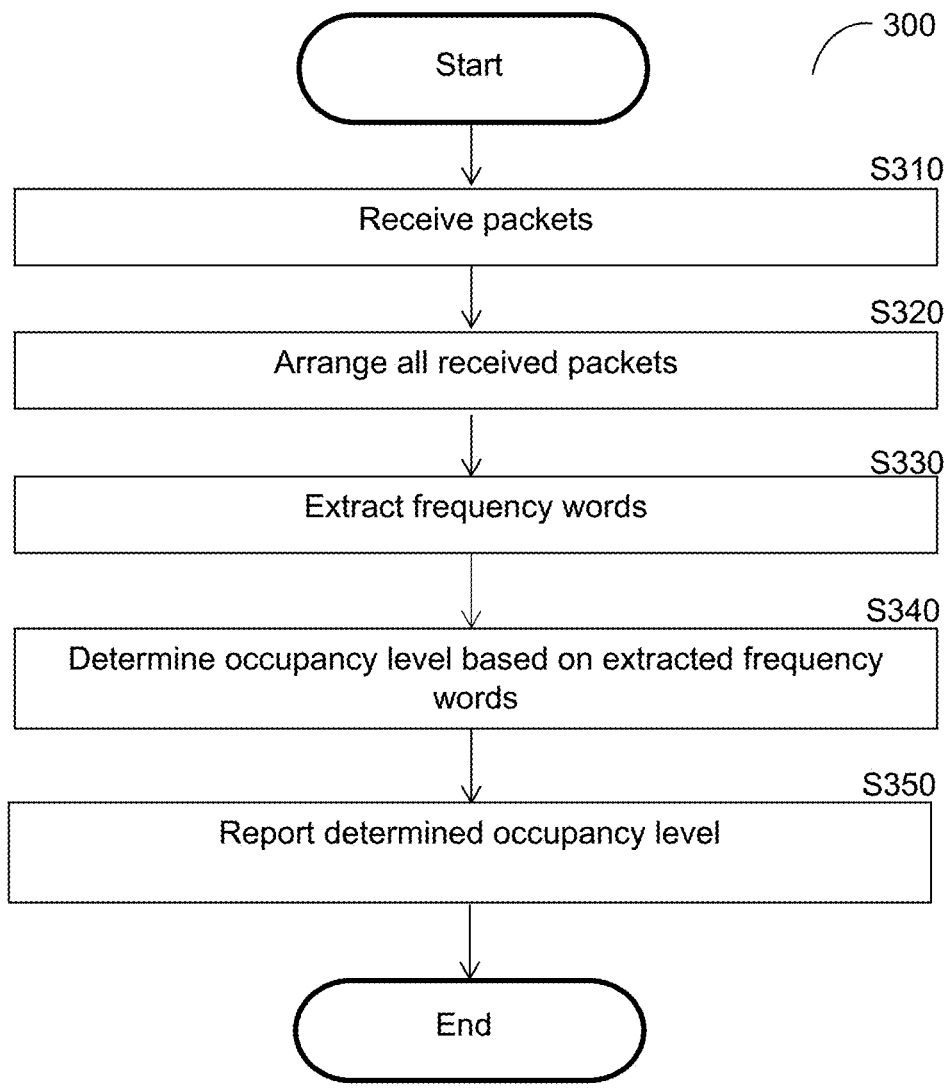
FIG. 3 is a flowchart of a method for monitoring and determining occupancy level of items on a surface according to an embodiment.

FIG. 3 shows an example flowchart 300 illustrating a method for determining the occupancy level of items placed on a surface according to an embodiment. The surface, as defined above, may be in any shape of form and may include, for example, a shelf, a container, a box, and the like. The surface is preoccupied with a plurality of IoT tags (e.g., IoT tags 110, FIG. 1). The number of IoT tags placed on the shelf is determined based on the required measurement resolution, the type of items placed on the surface, the environmental conditions (e.g., humidity, temperature, etc.) where the surface is located, and so on. For example, the higher the number of placed tags, the higher the resolution is. As another example, for small size items, more tags are required to achieve accurate measurements.

In the computation of the occupancy level, at least one baseline is predetermined. The baseline may be an "empty baseline" having frequency values when no items are placed on the surface. Collectivity or alternatively, another baseline may include a "full baseline" of frequency values when items are placed on the surface at maximum capacity. That is, the empty baseline and the full baseline may represent the lowest occupancy level and the highest occupancy level, respectively. A baseline includes at least a reading of a frequency word of each tag on the surface when the surface is empty or full.

Each baseline may be measured at a certain location and uploaded to a server, e.g., the server 140. A baseline may be measured or otherwise determined for each surface type (e.g., shelf, box, etc.) at a certain location (e.g., a grocery store). In an embodiment, a classifier (e.g., a machine learning classifier) is trained using the empty baseline, the full baseline, or both as measured for a single surface in specific locations. For example, a classifier is trained for a single shelf in a store, and then the trained classifier can be applied to all shelves in the store or other stores. An example method for training a classifier is discussed below.

At S310, packets are received. The packets are sent by IoT tags placed on the surface and relayed to a server (e.g., server 140) by a gateway (e.g., gateway 120) located in proximity to the IoT tags. Each packet may include a frequency word detected or measured by an IoT tag and an ID associated with the IoT tag. Further, each packet includes a group ID designating the surface that the items were placed on. The group ID is a quick reference for the specific surface (e.g., a shelf or box) associated with the IoT tag. In a further embodiment, the frequency word may be replaced by or accommodated by a received signal strength indicator (RSSI) sent by an IoT tag and encapsulated by the gateway. The RSSI is a measurement of the power present in a received radio signal.

At S320, all received packets received during a predefined time window (ti) are arranged based on their group IDs. The time window (ti) is referred to as a current time window.

At S330, frequency words included in the received packets received during the predefined time window (ti) and having the same group ID are extracted from such packets. In an embodiment, any RSSI value included in each such packet is extracted.

At S340, the extracted frequency words are analyzed to determine the occupancy level. Specifically, various methods, processes, or algorithms can be applied to determine the occupancy level from the extracted frequency words.

In an embodiment, the number of tags that transmitted a frequency word different than their respective frequency word as recorded in the empty baseline are counted. The occupancy level is determined as the percentage of tags having changes in the frequency words with respect to a total number of tags on the surface. In a similar fashion, the number of tags that transmitted a frequency word different than their respective frequency word as recorded in the full baseline are counted. The occupancy level is determined as the percentage of tags having changes in the frequency words with respect to a total number of tags on the surface. In a further embodiment, an average of occupancy levels determined using the empty and full baseline is computed to achieve a higher degree of accuracy.

In another embodiment, a machine learning process is utilized to determine the occupancy level. To this end, data features applied to a trained model may include values of the frequency words and/or the rate that such words are received. A value of a frequency word may be computed using, a Fast Fourier transform (FFT). In some embodiments, some received frequency words may be filtered out if, for example, such values are deemed invalid. The filtration may be based on an established decision boundary or a defined boundary. The boundary may be set based on a signal strength, and the RSSI values included in the packages.

The data features (derived from the frequency words) are fed into the trained classifier. As discussed in FIG. 4, the classifier is developed and trained based on a combination of labeled samples of frequency words representing empty and full surfaces. A classifier may be trained for a specific type of surface and/or a specific type of item. For example, a classifier for olive oil bottles place on a shelf will be different from a classifier trained for potatoes in a box. Thus, in some embodiments, S340 includes calling the appropriate classifier based on the surface and/or items being monitored. The appropriate classifier, upon applying the extracted frequency words, would output the occupancy level for the surface.

At S350, the determined occupancy level is reported. The occupancy level may be sent to a handheld device (e.g., the user device 170), a gateway (e.g., the gateway 120), and/or an additional external system, e.g., an inventory management system.

Figure 4:
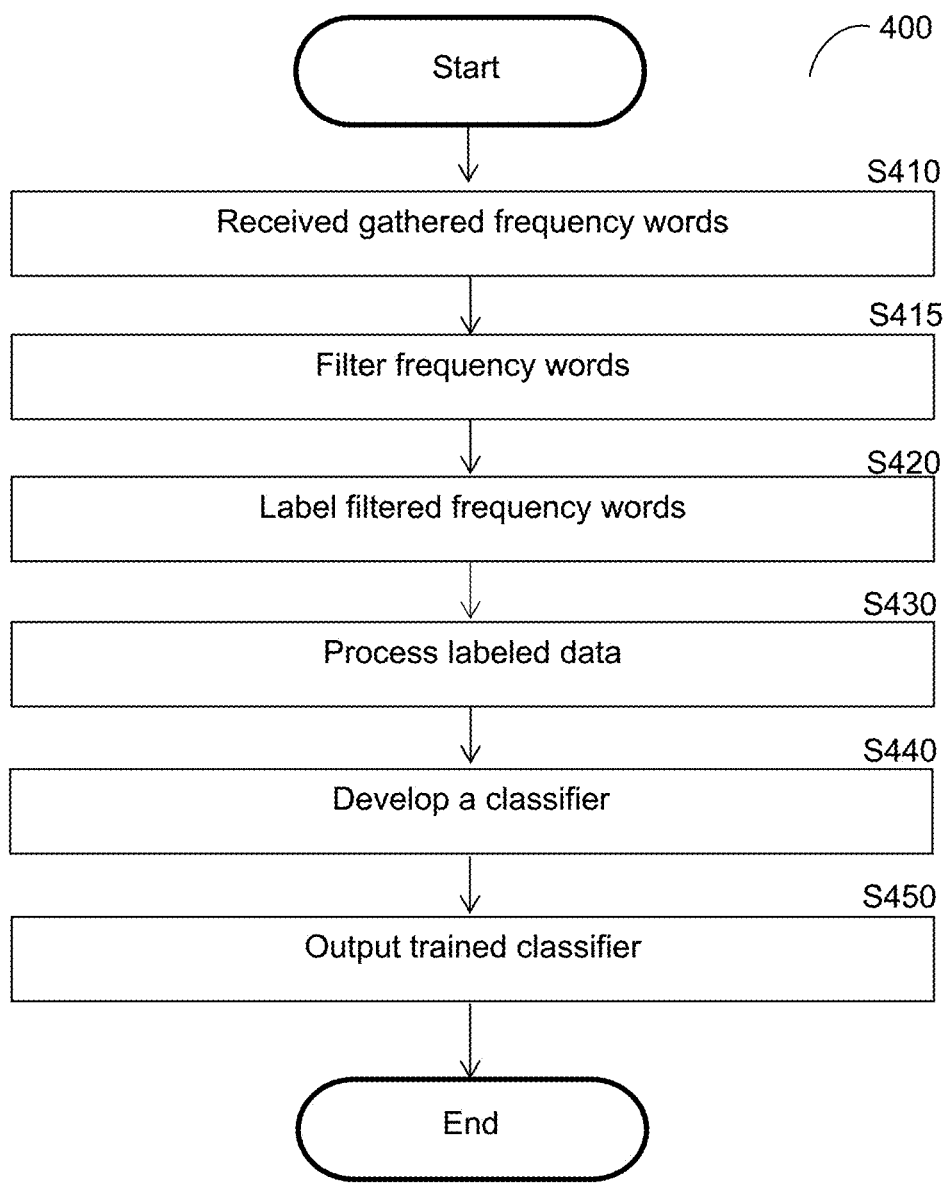
FIG. 4 is a flowchart for a method of training a classifier for monitoring and determining occupancy level of items on a surface according to an embodiment.

FIG. 4 is an example flowchart 400 for a method of training a model for determining occupancy level of items placed on a surface according to an embodiment.

At S410, frequency words gathered from measurements by IoT tags placed on the surface are received. At S415, the received frequency words may be filtered based on, for example, RSSI values associated with the frequency words.

At S420, filtered frequency words are labeled as "empty", "full", or "unknown." An empty label means that the surface is empty of items, where a "full' label means the opposite. The unknown label is when determination cannot be made. In further embodiment, metadata that can be used for the classification is also received. The metadata may include, but not limited to, type of items to be placed on or in the surface, the environment conditions from the where the frequency words are transmitted, and so on.

At S430, the labeled data (frequency words) are further processed, averaged, and sharpened by a semi-supervised algorithm or a supervised algorithm. At S440, a classifier is developed, based on the processed and labeled frequency words to determine an occupancy level of items placed on the surface. The classifier can be developed using a supervised or semi-supervised model, such as a Naive Bayes, Neural Network, k-nearest-neighbors, decision tress, support vector machine, and the like.

At S450, upon processing of sufficient number of labeled frequency words, the trained classifier is output. In an embodiment, the trained classifier is generated per a specific type of surface or a combination of surface and items. The sufficient number may be determined, for example, based on a predefined number of labeled frequency words received during a predefined time interval.

Figure 5:
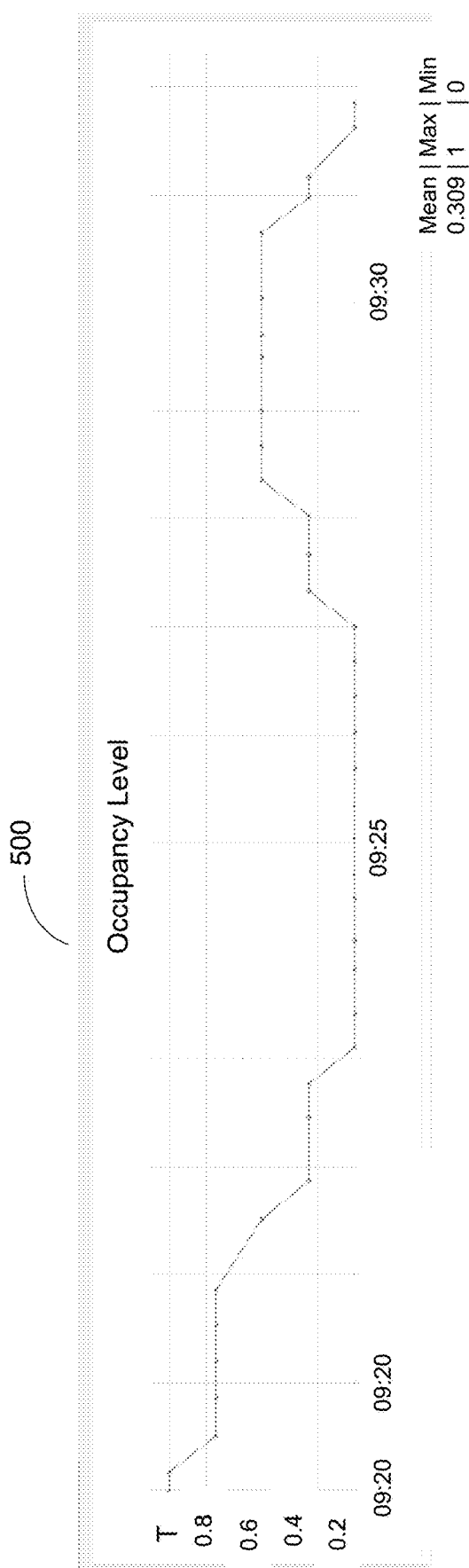
FIG. 5 is a graph showing a monitored occupancy level of items on a shelf overtime according to an example embodiment.

The methods discussed herein allow for continuous monitoring of an occupancy level of items placed on a surface. FIG. 5 shows an example graph 500 demonstrating the occupancy level of a shelf over time according to an example embodiment. Here, the level is normalized. That is, 1 level means a full occupancy and 0 is no occupancy. As can be seen in FIG. 5, some statistics (maximum, minimum, and average) of the occupancy level during about 2 hours are also shown. It should be noted that such statistics may be determined for predefined parameters, such as, but not limited to, time, number of shelves, and the like, and which may be modified.

FIG. 6 is an example schematic diagram of the gateway 120 according to an embodiment. The gateway 120 includes a BLE communication card 650 and a network interface card (NIC) 620. In an embodiment, the BLE communication card 650 communicates with the IoT tag 110 over a BLE network (not shown), while the NIC 620 allows communication with the server 140 over the Internet (not shown), or other type of network.

In an embodiment, the gateway 120 may be installed with an agent or application executed by the processor 670 and stored in the memory 680. The agent, when executed, is configured to control the communication with the IoT tag 110 and the server 140.

It should be noted that the processor 670 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 680 may be volatile (e.g., RAM, etc.), non-volatile (e.g., ROM, flash memory, etc.), or a combination thereof. The agent (or application) is realized in software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 670, cause the execution of the agent over the processor 670.

FIG. 7 shows an example schematic diagram of an IoT tag 110, designed according to the disclosed embodiments. The form factor of the IoT tag 110 is an on-die package-less tag. The IoT tag 110, as schematically demonstrated in FIG. 7, includes an energy harvester 701, coupled to an on-die capacitor 702 and an external passive capacitor 702', a power management unit (PMU) 703, a microcontroller 704, a system on chip (SoC) 705, and a retention memory 706. The IoT tag 110 further may include at least one antenna 710 glued to a substrate 720, for example. In another embodiment, the antenna 710 may be printed or etched onto the substrate 720. In a further embodiment, a passive external capacitor may take the place of the antenna 710. In an embodiment, the substrate 720 is made of a low-cost material, such as, but not limited to, polyethylene (PET), polyimide (PI), and polystyrene (PS). In another embodiment, the substrate's 720 pattern (layout) can be any of aluminum, copper, or silver. The glue utilized to glue the die and/or antenna 710 may include materials such as an anisotropic conductive film (ACP), any type of conductive glue, solder paste, and the like.

In the embodiment shown in FIG. 7, the antenna 710 is coupled to the harvester 701 and may be utilized for energy harvesting as well as wireless communication. In some embodiments, multiple antennas may be utilized to harvest energy at multiple frequency bands. Other embodiments may include one or more antenna for energy harvesting and an antenna to receive/transmit wireless signals at the BLE frequency band. In some embodiments, the IoT tag includes a printed battery.

The SoC 705 includes a number of execution functions realized as analog circuits, digital circuits, or both. Examples for such execution functions are provided below. The SoC 705 is also configured to carry out processes independently or under the control of the microcontroller 704. Each process carried out by the SoC 705 also has a state, and processes can communicate with other processes through an IPC protocol. In the configuration illustrated in FIG. 7, the SoC 705 and/or the microcontroller 704 loads the context of processes and reads data from the retention memory 706.

The SoC 705 is partitioned into multiple power domains. Each power domain is a collection of gates powered by the same power and ground supply. To reduce the power consumption, only one power domain is turned on during execution. The SoC 705 can perform functions, such as reading from and writing to memory, e.g., of peripherals, and can execute simple logic operations; tracking power level of the SoC 705; generating and preparing data packets for transmission; cyclic redundancy check (CRC) code generation; packet whitening; encrypting/decrypting and authentication of packets; converting data from parallel to serial; and staging the packet bits to the analog transmitter path for transmission.

In a preferred embodiment, the SoC 705 includes an oscillator calibration circuit (OCC) 705-A. The OCC 705-A includes at least one frequency locking circuit (FLC), each of which is coupled to an oscillator (both are not shown). The FLC calibrates the frequency of an oscillator using an over-the-air reference signal. In an embodiment, the calibration of the respective oscillator is performed immediately prior to a data transmission session and remains free running during the data transmission session. The FLC can be realized using frequency locked loop (FLL), a phased locked loop (PLL), and a delay locked loop (DLL). An example implementation of an oscillator calibration circuit 705-A is discussed in U.S. Pat. No. 10,886,929 to Yehezkely, assigned to the common assignee.

According to the disclosed embodiments, the energy harvester 701, the capacitor 702, PMU 703, microcontroller 704, SoC 705, and retention memory 706 are integrated in a die 730. The die 730 is glued to the substrate 720. The IoT tag 110 does not include any external DC power source, such as a battery.

In an embodiment, the microcontroller 704 implements electronic circuits (such as, memory, logic, RF, etc.) performing various functions allowing communication using a low energy (power) communication protocol. Examples for such a protocol includes, but are not limited to, Bluetooth®, LoRa, Wi-Gi®, nRF, DECT®, Zigbee®, Z-Wave, EnOcean, and the like. In a preferred embodiment, the microcontroller 704 operates using a Bluetooth Low energy (BLE) communication protocol.

In some embodiments, the microcontroller 704 is integrated with wireless sensors (not shown) to a complete an IoT device functionality.

The harvester 701 is configured to provide multiple voltage levels to the microcontroller 704, while maintaining a low loading DC dissipation value. In an example implementation, the energy harvester 701 may include a voltage multiplier coupled to the antenna 710. The voltage multiplier may be a Dickson multiplier, while the antenna 710 is a receive/transmit antenna of the microcontroller 704. That is, in such a configuration, the antenna is primarily designed to receive and/or transmit wireless signals according to the respective communication protocol of the low-energy IoT tag 110 (e.g., 2.400-2.4835 GHz signal for BLE communication).

It should be noted that the antenna 710 may also be designed for energy harvesting and may operate on a different frequency band, direction, or both, than those defined in the standard of the respective communication protocol. Regardless of the configuration, energy can be harvested from any wireless signals received over the air. Alternatively, energy can be harvested from any other sources, such as solar, piezoelectric signals, and the like.

The harvested energy is stored in the on-die capacitor 702 and/or the external capacitor 702'. The PMU 703 is coupled to the capacitor 702 and is configured to regulate the power to the microcontroller 704 and SoC 705. Specifically, as the capacitance of the capacitor 702 is very limited, the power consumption should be carefully maintained. This maintenance is performed to avoid draining of the capacitor 702, thus resetting the microcontroller 704. The PMU 703 can be realized using a Schmitt trigger that operates on a predefined threshold (Vref), e.g., Vref=0.85V.

In another embodiment, the PMU 703 may be further configured to provide multi-level voltage level indications to the microcontroller 704. Such indications allow the microcontroller 704 to determine the state of a voltage supply at any given moment when the capacitor 702 charges or discharges. According to this embodiment, the PMU 703 may include a detection circuitry controlled by a controller. The detection circuitry includes different voltage reference threshold detectors, where only a subset of such detectors is active at a given time to perform the detection.

The IoT tag 110 does not include any crystal oscillator providing a reference clock signal. According to an embodiment, the reference clock signal is generated using over-the-air signals received from the antenna 710. As noted above, in a typical deployment, a free running oscillator is locked via a Phase-Locked Loop (PLL) to a clock, originating from a crystal oscillator. According to the disclosed embodiments, the OCC 705-A calibrates the frequency of an oscillator using an over-the-air reference signal. The oscillator(s) implemented in the tag 730 are on-die oscillators and may be realized as a digitally controlled oscillator (DCO).

The retention memory 706 is a centralized area that is constantly powered. Data to be retained during low power states is located in the retention memory 706. In an embodiment, the retention area is optimized to subthreshold or near threshold voltage, e.g., 0.3V-0.4V. This allows for the reduction of the leakage of the retention cells.

Figure 8:
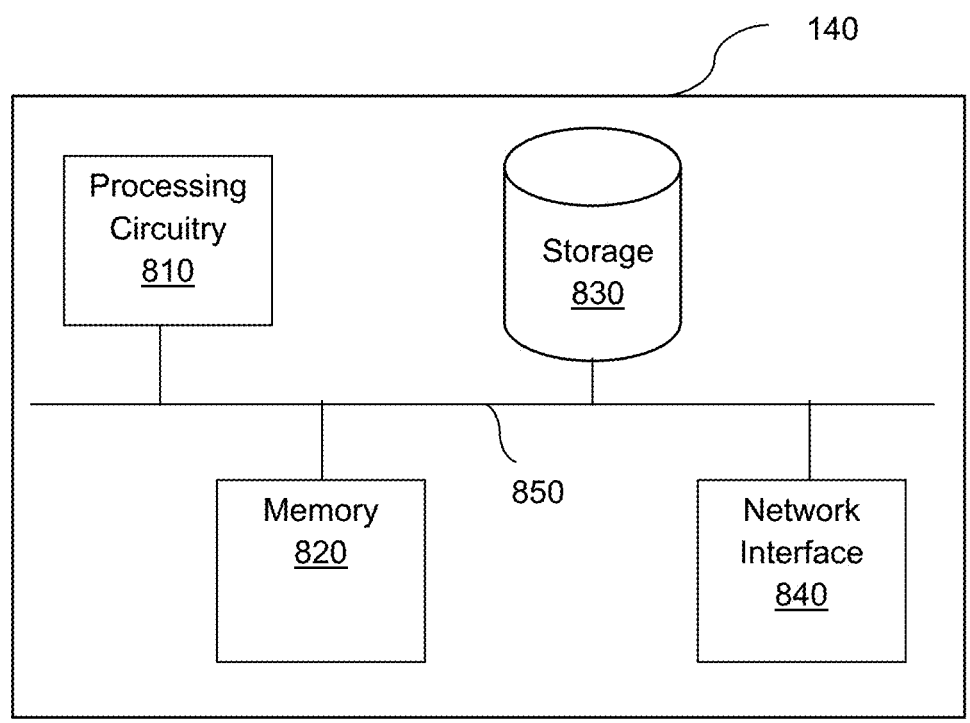
FIG. 8 is a schematic diagram of a server according to an embodiment.

FIG. 8 is an example schematic diagram of a server 140 according to an embodiment. The server 140 includes a processing circuitry 810 coupled to a memory 820, a storage 830, and a network interface 840. In an embodiment, the components of the server 140 may be communicatively connected via a bus 850.

The processing circuitry 810 may be realized as one or more hardware logic components and circuits, examples of which are provided above.

The memory 820 may be volatile (e.g., RAM, etc.), non-volatile (e.g., ROM, flash memory, etc.), or a combination thereof. In one configuration, computer readable instructions to implement one or more embodiments disclosed herein may be stored in the storage 830.

In another embodiment, the memory 820 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, CD-ROM, Digital Versatile Disks (DVDs), or any other medium which can be used to store the desired information.

The network interface 840 allows the server 140 to communicate with the gateways (e.g., gateways 120, FIG. 2) and with the user device (e.g., user device 170, FIG. 1) for the purpose of, for example, receiving data, sending data, and the like. Further, the network interface 840 allows the server 140 to communicate with the IoT tag 110 for the purpose of collecting frequency words.

It should be understood that the embodiments described herein are not limited to the specific architecture illustrated in FIG. 8, and other architectures may be equally used without departing from the scope of the disclosed embodiments.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for determining and monitoring occupancy level of items placed on a surface, comprising:
receiving frequency words from tags placed on the surface, wherein each tag is configured to transmit a plurality of frequency words;
extracting at least one data feature from the plurality of frequency words, wherein each data feature changes in response to an item placed in a proximity to a respective tag;
determining, based on the extracted at least one data feature from a group of tags placed on the surface and based on at least one baseline, the occupancy level of items placed on the surface; and
reporting the determined occupancy level of items.

2. The method of claim 1, wherein the at least one baseline is at least one of: an empty baseline providing the values of frequency words when no items are placed on the surface, and a full baseline providing the values of frequency words when items are placed on the surface at a maximum capacity.

3. The method of claim 1, further comprising:
classifying the at least one extracted data feature based on a trained machine learning model.

4. The method of claim 3, further comprising:
training the machine learning model with respect to a type of the surface.

5. The method of claim 3, further comprising:
training the machine learning model using labeled samples of frequency words representing any one of: an empty surface and a full surface.

6. The method of claim 1, wherein the extracted at least one data feature is any one of: a change of value of two consecutive frequency words, and a transmission rate of the frequency words.

7. The method of claim 1, further comprising:
filtering invalid frequency words based on a RSSI value; and
computing a value of a valid frequency word.

8. The method of claim 7, wherein determining the occupancy level of items placed on the surface further comprising:
computing the occupancy level as a percentage of tags having changes in the frequency words with respect to a total number of tags on the surface, wherein the changes in the frequency words is determined relative to the at least one baseline.

9. The method of claim 1, wherein each frequency word is based on a frequency calibration of the tag.

10. The method of claim 1, wherein a value of a frequency word changes when the tag is out of a calibration.

11. The method of claim 1, wherein each received frequency word is measured as dBC/Hz, wherein the dBC is dBC unit is decibels relative to the carrier.

12. The method of claim 1, wherein the frequency words are transmitted over a Bluetooth Low Energy (BLE) protocol.

13. The method of claim 1, wherein tag is a battery-less internet of things (IoT) tag in a form factor of a label attached to the surface.

14. The method of claim 1, wherein the surface is any one of: a shelf, a container, a box, and a barrel in any form, shape or material.

15. The method of claim 1, further comprising:
setting a number of tags attached to the surface based on at least one of: a required measurement resolution, a type of items placed on the surface, and environmental conditions where the surface is located.

16. A non-transitory computer readable medium having stored thereon instructions for causing a processing circuitry to execute a process for determining and monitoring occupancy level of items placed on a surface, the process comprising:
receiving frequency words from tags placed on the surface, wherein each tag is configured to transmit a plurality of frequency words;
extracting at least one data feature from the plurality of frequency words, wherein each data feature changes in response to an item placed in a proximity to a respective tag;
determining, based on the extracted at least one data feature from a group of tags placed on the surface and based on at least one baseline, the occupancy level of items placed on the surface; and
reporting the determined occupancy level of items.

17. A system for determining and monitoring occupancy level of items placed on a surface, comprising:
receiving frequency words from tags placed on the surface, wherein each tag is configured to transmit a plurality of frequency words;
extracting at least one data feature from the plurality of frequency words, wherein each data feature changes in response to an item placed in a proximity to a respective tag;
determining, based on the extracted at least one data feature from a group of tags placed on the surface and based on at least one baseline, the occupancy level of items placed on the surface; and
reporting the determined occupancy level of items.

18. The system of claim 17, wherein the at least one baseline is at least one of: an empty baseline providing the values of frequency words when no items are placed on the surface, and a full baseline providing the values of frequency words when items are placed on the surface at a maximum capacity.

19. The system of claim 17, wherein the system is further configured to:
classify the at least one extracted data feature based on a trained machine learning model.

20. The system of claim 19, wherein the system is further configured to:
training the machine learning model with respect to a type of the surface.

21. The system of claim 19, wherein the system is further configured to:
training the machine learning model using labeled samples of frequency words representing any one of: an empty surface and a full surface.

22. The system of claim 17, wherein the extracted at least one data feature is any one of: a change of value of two consecutive frequency words, and a transmission rate of the frequency words.

23. The system of claim 17, wherein the system is further configured to:
filter invalid frequency words based on a RSSI value; and
compute a value of a valid frequency word.

24. The system of claim 23, wherein the system is further configured to:
  compute the occupancy level as a percentage of tags having changes in the frequency words with respect to a total number of tags on the surface, wherein the changes in the frequency words is determined relative to the at least one baseline.

25. The system of claim 17, wherein each frequency word is based on a frequency calibration of the tag.

26. The system of claim 17, wherein a value of a frequency word changes when the tag is out of a calibration.

27. The system of claim 17, wherein each received frequency word is measured as dBC/Hz, wherein the dBC is dBC unit is decibels relative to the carrier.

28. The system of claim 17, wherein the frequency words are transmitted over a Bluetooth Low Energy (BLE) protocol.

29. The system of claim 17, wherein tag is a battery-less internet of things (IoT) tag in a form factor of a label attached to the surface.

30. The system of claim 17, wherein the surface is any one of: a shelf, a container, a box, and a barrel in any form, shape or material.

31. The system of claim 17, wherein the system is further configured to:
  setting a number of tags attached to the surface based on at least one of: a required measurement resolution, a type of items placed on the surface, and environmental conditions where the surface is located.

* * * * *